United States Patent [19]
Heinrich

[11] Patent Number: 5,873,334
[45] Date of Patent: Feb. 23, 1999

[54] EXHAUST VALVE SYSTEM FOR TWO-CYCLE ENGINES

[75] Inventor: Martin W. Heinrich, Warroad, Minn.

[73] Assignee: Polaris Industries Inc., Roseau, Minn.

[21] Appl. No.: 955,659

[22] Filed: Oct. 22, 1997

[51] Int. Cl.⁶ ....................................... F02B 75/02
[52] U.S. Cl. .............................................. 123/65 PE
[58] Field of Search .................. 123/65 PE, 65 EM, 123/65 V, 65 P

[56] References Cited

U.S. PATENT DOCUMENTS

| | | |
|---|---|---|
| 1,462,945 | 7/1923 | Spiro . |
| 2,479,593 | 8/1949 | Weyandt . |
| 3,926,157 | 12/1975 | Lippitsch . |
| 4,121,552 | 10/1978 | Mithuo et al. . |
| 4,202,297 | 5/1980 | Oku et al. . |
| 4,333,431 | 6/1982 | Iio et al. . |
| 4,341,188 | 7/1982 | Nerstrom . |
| 4,364,346 | 12/1982 | Shiohara . |
| 4,388,894 | 6/1983 | Tanaka et al. . |
| 4,391,234 | 7/1983 | Holzleitner . |
| 4,399,788 | 8/1983 | Bostelmann . |
| 4,707,987 | 11/1987 | Atkin . |
| 4,723,514 | 2/1988 | Taniuchi . |
| 4,793,347 | 12/1988 | Taniuchi et al. . |
| 4,819,590 | 4/1989 | Ban et al. . |
| 4,829,945 | 5/1989 | Yamamoto et al. . |
| 4,829,946 | 5/1989 | Boyesen . |
| 4,903,647 | 2/1990 | Yamamoto et al. . |
| 4,944,255 | 7/1990 | Duret . |
| 4,986,780 | 1/1991 | Sougawa . |
| 5,000,131 | 3/1991 | Masuda . |
| 5,016,583 | 5/1991 | Blish . |
| 5,092,284 | 3/1992 | Yamada . |
| 5,136,989 | 8/1992 | Sterbenz et al. . |
| 5,209,192 | 5/1993 | Ahmed et al. . |

FOREIGN PATENT DOCUMENTS

NR.183273  9/1955  Austria .

*Primary Examiner*—Marguerite McMahon
*Attorney, Agent, or Firm*—Fredrikson & Byron, P.A.

[57] ABSTRACT

An exhaust valve system for internal combustion engine. The engine includes a cylinder having an exhaust port with an axial extent along the axis of the cylinder structure. An exhaust port valve is mounted adjacent to the exhaust port and is adjustable between a full-flow position, in which the exhaust port valve exposes the exhaust port throughout its axial extent, and a restricting position, in which the exhaust port valve restricts the axial extent of the exhaust port. A valve control module is connected to the exhaust port valve and functions to adjust the exhaust port valve between the full-flow and restricting positions in response to the cylinder bore gas pressure. At low speeds and low output conditions, the valve is in its restricting position. As the cylinder develops higher pressures at higher speeds and under higher output conditions, the valve control module moves the valve to its full-flow position.

13 Claims, 4 Drawing Sheets

EXHAUST VALVE SYSTEM FOR TWO-CYCLE ENGINES

TECHNICAL FIELD

The present invention relates to two-cycle internal combustion engines, and in particular, to an exhaust valve system for two-cycle internal combustion engines.

BACKGROUND OF THE INVENTION

Two-cycle engines generally have exhaust and intake ports in the side walls of a cylinder. The intake ports or inlet valves feed an air and fuel mixture to the cylinder for combustion. The exhaust port opens to an exhaust passage system where the engine's burnt gases are released. Among its several functions, the reciprocation of the piston in the cylinder across each port cyclically seals and opens each port to effect the proper movement of gases through the engine. Since the ports' locations remain fixed within the cylinder, the exhaust port and intake ports are opened and closed at a fixed time and location with respect to the engine's cycle.

The timing of the engine's cycle for opening and closing the exhaust port and intake ports directly affects the entire engine operation, including its horsepower, fuel efficiency, emissions toxicity, and even its ability to sustain continuous operation. In addition, optimal valve timing varies depending upon the engine speed and load. At high engine speeds, keeping the exhaust port open longer will improve engine performance at such higher engine speeds. If such longer duration is permanently fabricated into the cylinder design, however, the engine will perform poorly at low speeds, where a comparatively shorter exhaust-port-open duration produce better performance.

Thus, unless one can vary the otherwise fixed timing of the exhaust port, the engine will only perform optimally at a certain rpm range. A number of attempts to remedy this problem have been made. Commonly these prior art engines provide some mechanism for covering the upper portion of the exhaust port under low speed operation, effectively lowering the top of the exhaust port in the cylinder to reduce the length of time that the port is open during the engine's cycle. Prior art engines also provide a mechanism to vary the height or axial extent of the exhaust port depending upon the engine operation.

In many cases such prior art systems respond inaccurately or relatively slowly to changing engine conditions, such as fast acceleration or deceleration. For instance, some prior art engines vary the axial extent of the exhaust port based upon throttle position. While throttle position may roughly approximate an engine's load, it provides insufficient indication of the engine's current speed. Since the optimal valve position depends upon both engine speed and load, such prior art engines lack accuracy. U.S. Pat. No. 4,399,788 (Bostelmann) teaches the technique of adjusting exhaust valve position based upon exhaust gas pressure measured in the exhaust system. Changes in an engine's speed and power output propagate into the exhaust system, which functions as a pressure vessel. Higher pressure in the exhaust gas system therefore correspond to higher engine speed and power output. Pressure in the exhaust system is therefore sensed by a diaphragm and used to control the position of the exhaust valve.

The assignee of the Bostelmann patent has commercialized such an exhaust valve system that senses gas pressure in the exhaust system and adjusts the exhaust valve position (and, therefore, the timing) based on that pressure. The Bostelmann system, however, is dependent on the exhaust system to function as a pressure vessel, accurately capturing pressure to operate the exhaust valve system. If, however, the exhaust system gets too loose or becomes disconnected, the pressure sensed drops and the exhaust valve system will not function properly.

Accordingly, it would be desirable to have an exhaust valve system that would function independent of the condition of the exhaust system.

SUMMARY OF THE INVENTION

The invention provides an exhaust valve system for internal combustion engine that operates independent of the condition of the exhaust system. The engine includes a cylinder having an exhaust port with an axial extent along the axis of the cylinder structure. A piston is axially reciprocable in the cylinder bore and operable to develop a cylinder bore gas pressure in the cylinder bore. The piston is adapted to open and close the exhaust port as it reciprocates up and down. An exhaust port valve is mounted adjacent to the exhaust port and is adjustable between a full-flow position, in which the exhaust port valve exposes the exhaust port throughout its axial extent, and a restricting position, in which the exhaust port valve restricts the axial extent of the exhaust port. A valve control module is connected to the exhaust port valve and functions to adjust the exhaust port valve between the full-flow and restricting positions in response to the cylinder bore gas pressure. At low speeds and low output conditions, the valve is in its restricting position. As the cylinder develops higher pressures at higher speeds and under higher output conditions, the valve control module moves the valve to its full-flow position.

DETAILED DESCRIPTION OF THE INVENTION

Figure 1:
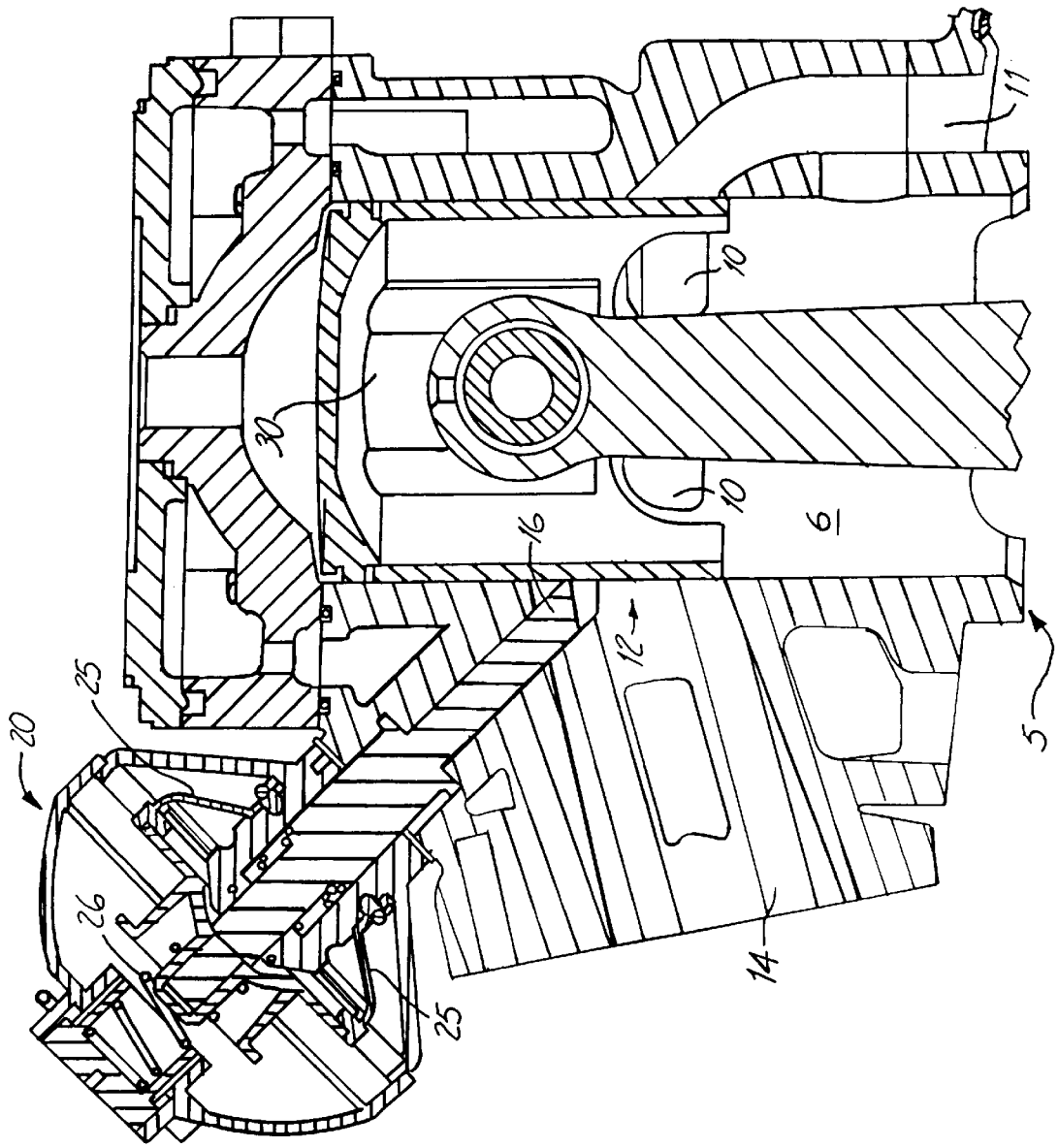
FIG. 1 is a cross-sectional view showing the relevant portion of a two-cycle engine in accordance with one embodiment of the present invention.

The drawings depict a preferred embodiment of an engine incorporating the exhaust valve device of the invention. It will be understood, however, that many of the specific details of the exhaust valve system illustrated in the drawings could be changed or modified by one of ordinary skill in the art without departing significantly from the spirit of the invention.

As shown in FIG. 1, a preferred embodiment of an engine incorporating the exhaust valve system of the present invention includes a cylinder 5 having a cylindrical interior wall 6 which defines a cylinder bore. Intake ports 10 are formed in the cylinder 5 which connect to an intake passage 11. During engine operation, air-fuel mixture is supplied to the cylinder bore through the intake ports 10. An exhaust port 12 is also formed in the cylinder wall 6 and it connects to an exhaust passage system 14 for exhausting combustion gases from the cylinder during engine operation. A piston 30 is disposed in the cylinder 5 and is designed to reciprocate in the cylinder 5 upward in a compression stroke and downward in a power stroke. Among its functions, the piston reciprocates across both the intake ports 10 and the exhaust port 12 to open and close them at the proper times during operation of the engine. That is, as the piston 30 reciprocates across the intake ports 10, it alternately opens and sealingly closes the intake ports 10, thereby permitting and blocking, respectively, communication between the intake passage 11 and the cylinder bore. Similarly, as the piston 30 reciprocates across the exhaust port 12, it alternately opens and closes the exhaust port 12, thereby permitting and blocking, respectively, communication between the exhaust passage system 14 and the cylinder bore.

Exhaust port valve 16 is slidingly mounted adjacent to the exhaust port 12. This valve 16 is of a conventional sliding plate type, such as that shown in U.S. Pat. No. 4,121,552 issued on Oct. 24, 1978 to Mithuo et al. The exhaust port valve 16 is slidable between two extreme positions, a restricting position and a full-flow position. In the restricting position (shown in FIG. 1) the exhaust port valve 16 extends until it is flush with the cylinder wall 6, thereby covering the upper portion of the exhaust port 12 and effectively shortening the axial extent of the exhaust port 12. In the full-flow position, the exhaust port valve 16 is retracted from the cylinder wall 6 to expose the entire axial extent of the exhaust port 12 to the exhaust passage system 14.

A valve control module 20 is provided for adjusting the position of the exhaust port valve 16. Such control modules are well known, and need not be described in great detail. The control module may be, e.g., of the type shown in U.S. Pat. No. 4,399,788 issued on Aug. 23, 1983 to Bostelmann, or of any other suitable design for controlling the position of the exhaust port valve 16 in response to gas pressure in the cylinder. Typically the valve control module 20 includes a biasing mechanism (such as coil spring 26) positioned to urge the exhaust port valve 16 toward the restricting position, and a cylinder bore gas pressure sensor adapted to move the exhaust port valve 16 from the restricting position toward the full-flow position in response to an increase of the cylinder bore gas pressure. The gas pressure sensor typically includes a diaphragm 25 movable in response to a gas pressure differential on opposing sides of the diaphragm 25—a fixed pressure (such as ambient pressure) is provided on one side of the diaphragm 25, and the other side of the diaphragm 25 is exposed to the cylinder pressure. When cylinder pressure is sufficient to overcome the spring 26, the diaphragm 25 moves upwardly, retracting the exhaust port valve 16 from the restricting position.

Thus, during low speed engine operation, the exhaust port valve 16 remains biased in the restricting position due to the low gas pressure in the cylinder bore. As the engine speed increases the cylinder bore gas pressure also increases. The valve control module 20 responds to the added cylinder bore gas pressure and begins to retract the exhaust port valve 16 until it reaches the full-flow position. As the exhaust port valve 16 retracts it expose the upper portion of the exhaust port 12 to the exhaust passage system 14 which, in turn, advances the timing of when the exhaust port 12 opens during the piston's power stroke When the engine speed decreases, the valve control module 20 responds to the decreased cylinder bore gas pressure by extending the exhaust port valve 16 which retards the timing of when the exhaust port opens during the piston's power stroke.

A convenient way of connecting the valve control module 20 to the engine is by providing an air pressure sensing passageway 22 which terminates in a pressure sensing port 24 formed in the cylinder wall 6. This port 24 may be located in a variety of positions within the cylinder, but preferably is located at a position vertically above the uppermost edge of the exhaust port 12. The piston will therefore block the pressure sensing port 24 during part of the stroke (particularly during the very top portion of the compression stroke). However, the piston will expose the pressure sensing port 24 to cylinder bore pressure both before the exhaust port 12 opens in the piston's power stroke and after the exhaust port 12 closes in the piston's compression stroke. Thus, the valve control module 20 responds to cylinder bore gas pressure before the exhaust port opens. The valve control module 20 may respond quickly to changing engine conditions and functions entirely independently of the exhaust system.

Figure 2:
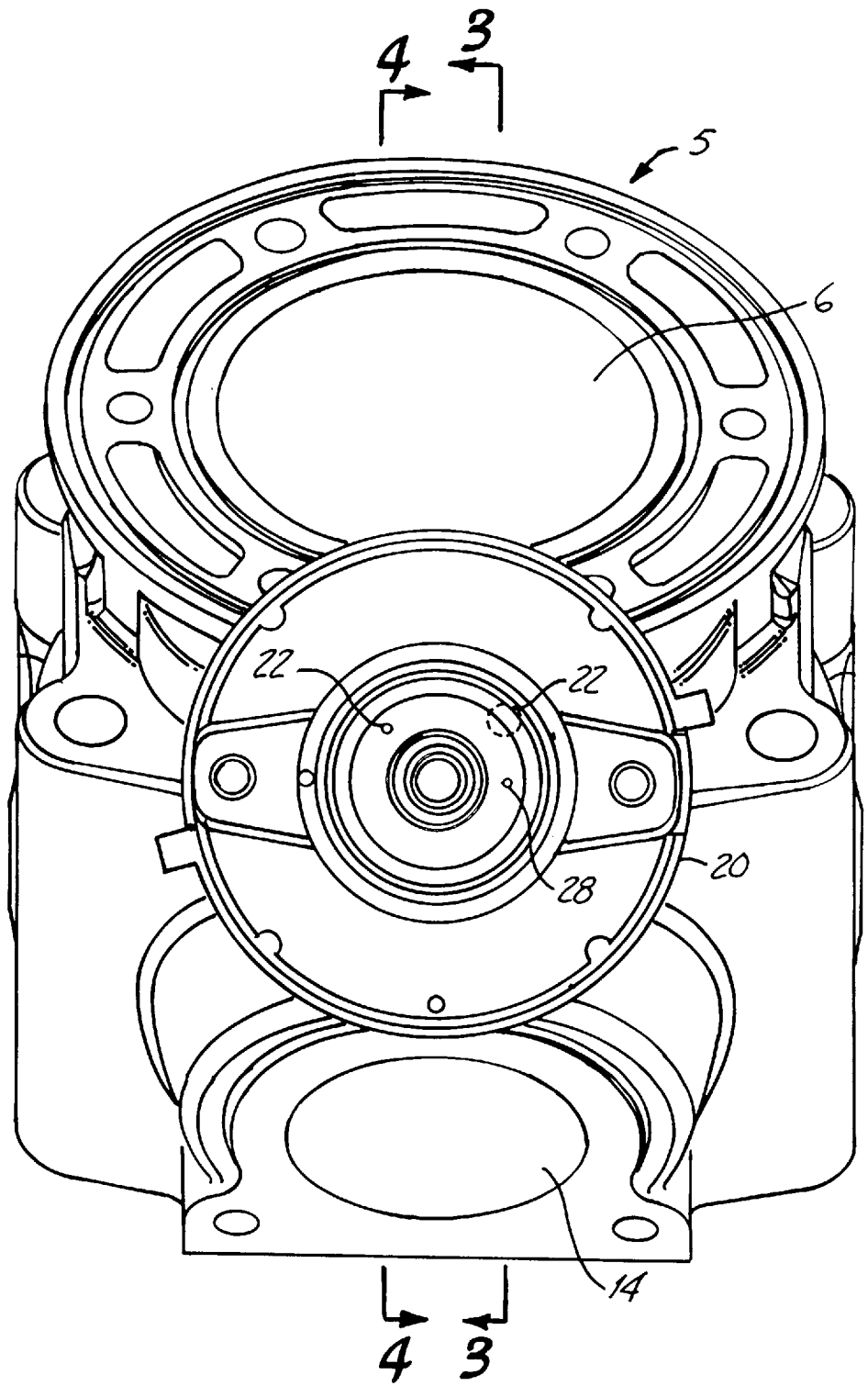
FIG. 2 is a perspective view of a portion of a cylinder block of the invention, showing internal structure of a valve control module.
Figure 3:
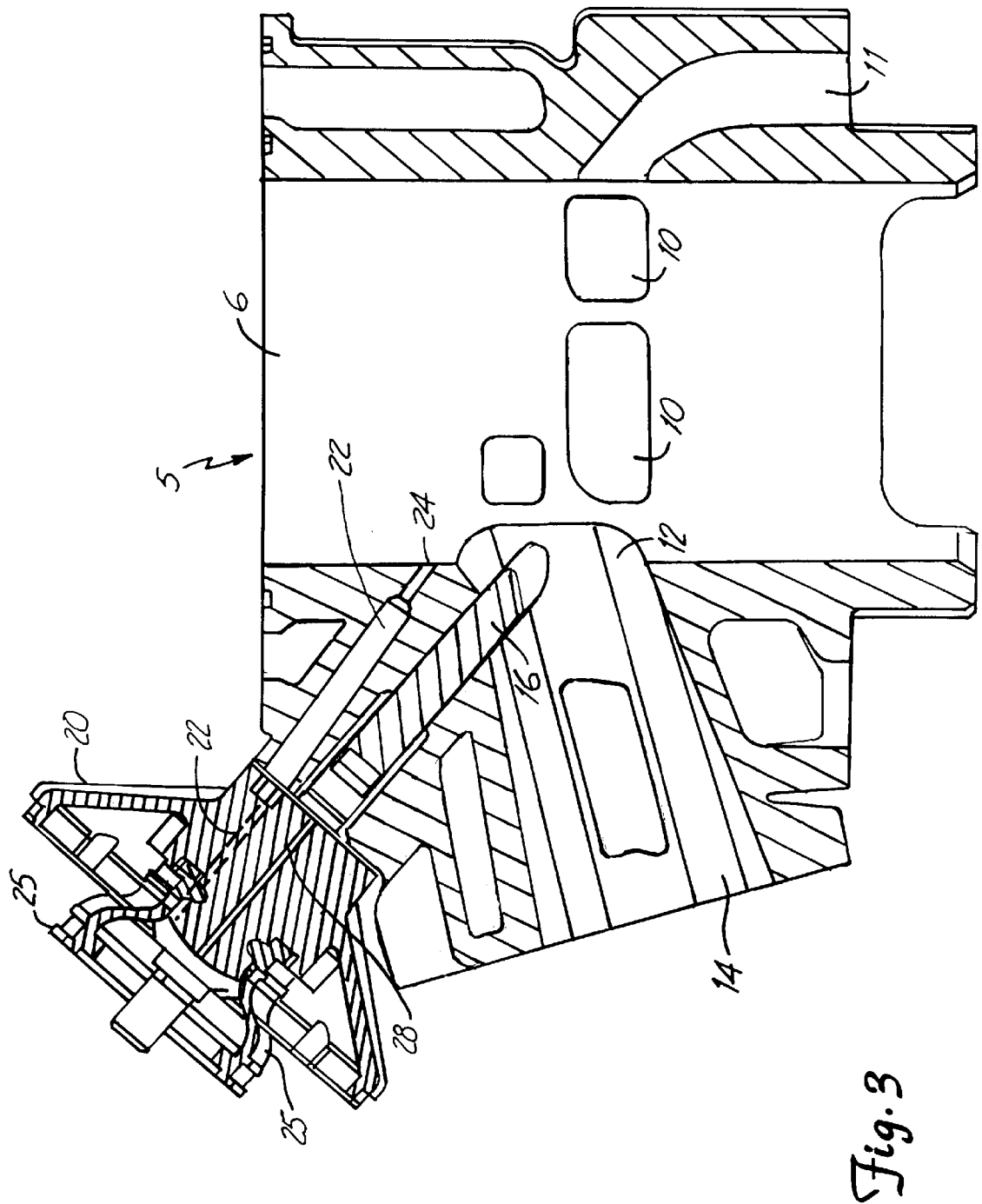
FIG. 3 is a cross-sectional view of FIG. 2, taken along lines 2—2 thereof.
Figure 4:
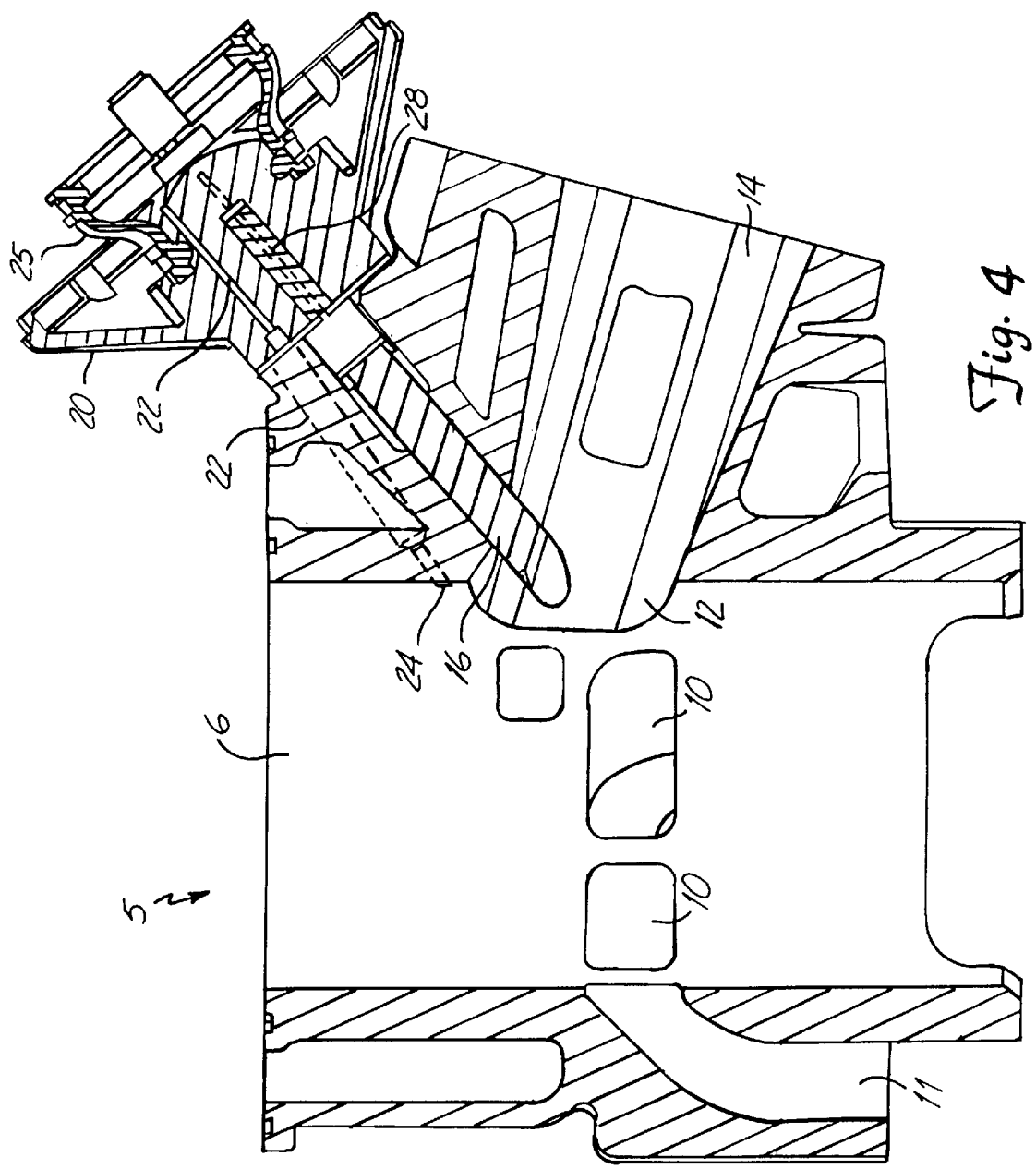
FIG. 4 is a cross-sectional view of FIG. 3, taken along lines 3—3 thereof.

Depending on the type of control module utilized it can be desirable to provide a dampening orifice 28 (see FIGS. 2–4) to dampen out the pressure pulses sensed by the control module as the engine cylinder fires. The dampening orifice 28 connects the cylinder pressure side of the diaphragm 25 to a lower pressure region in the engine, such as the exhaust port, the crankcase, the engine intake, or other suitable low pressure location (even ambient pressure). In the preferred embodiment shown in the drawings the dampening orifice 28 connects the cylinder pressure side of the diaphragm 25 to the cavity in which the exhaust port valve 16 slides, the tolerances between the valve 16 and the cavity permitting a small amount of bleed out of pressure pulses. Such a dampening orifice helps to extend the life of the diaphragm 25 and also bleeds off any unwanted gas, oil or other fluids that otherwise could become trapped within the control module.

While a preferred embodiment of the present invention has been described, it should be understood that various changes, adaptations and modifications may be made therein without departing from the spirit of the invention and the scope of the appended claims.

What is claimed is:

1. An internal combustion engine comprising:
   cylinder structure having an inside surface defining a cylinder bore having an axis and an exhaust port with an axial extent along the axis of the cylinder structure;
   a piston axially reciprocable in the cylinder bore and operable to develop a cylinder bore gas pressure in the cylinder bore, the piston being adapted to open and close the exhaust port;
   an exhaust port valve mounted to the cylinder structure adjacent to the exhaust port and adjustable between a full-flow position, in which the exhaust port valve exposes the exhaust port throughout its axial extent, and a restricting position, in which the exhaust port valve restricts the axial extent of the exhaust port; and
   a valve control operatively connected to the exhaust port valve and operable to adjust the exhaust port valve between the full-flow and restricting positions in direct response to the cylinder bore gas pressure.

2. The engine of claim 1 wherein the valve control comprises a biasing mechanism positioned to urge the exhaust port valve toward the restricting position and a cylinder bore gas pressure sensor adapted to move the exhaust port valve from the restricting position toward the full-flow position in response to an increase of the cylinder bore gas pressure.

3. The engine of claim 2 wherein the biasing mechanism includes a spring.

4. The engine of claim 2 wherein the gas pressure sensor includes a diaphragm movable in response to a gas pressure differential on opposing sides of the diaphragm, a high pressure side of the diaphragm being in fluid communication with the cylinder bore to provide cylinder bore gas pressure to such side of the diaphragm during at least a portion of the reciprocable movement of the piston.

5. The engine of claim 4 further comprising a dampening orifice connecting the high pressure side of the diaphragm to a lower pressure location.

6. The engine of claim 2 wherein the valve control includes a pressure sensing port formed in the cylinder structure, the pressure sensing port being in communication with the gas pressure sensor.

7. The engine of claim 6 wherein the pressure sensing port is positioned so that that the piston opens and closes the pressure sensing port, thereby allowing and blocking, respectively, communication between the cylinder bore and the valve control.

8. The engine of claim 7 wherein the piston has a power stroke and a compression stroke, the piston opening the pressure sensing port before it opens the exhaust port during the power stroke, and the piston closing the pressure sensing port after it closes the exhaust port during the compression stroke.

9. The engine of claim 1 wherein the piston has a power stroke and a compression stroke.

10. The engine of claim 9 wherein the exhaust port valve is positioned so that the piston opens the exhaust port later in the power stroke as the exhaust port valve is adjusted from the full-flow position to the restricting position.

11. The engine of claim 9 wherein the exhaust port valve is positioned so that the piston closes the exhaust port earlier in the compression stroke as the exhaust port valve is adjusted from the full-flow position to the restricting position.

12. The engine of claim 1 wherein the valve control is configured to adjust the exhaust port valve to advance exhaust port timing as the cylinder bore gas pressure increases.

13. The engine of claim 1 wherein the valve control adjusts the exhaust port valve to retard exhaust port timing as the cylinder bore gas pressure decreases.

* * * * *